US005636428A

United States Patent [19]

Van Mourik

[11] Patent Number: 5,636,428

[45] Date of Patent: Jun. 10, 1997

[54] DADO CUTTING BLADE ARRANGEMENT

[75] Inventor: Johannes Van Mourik, Glen Ellen, Calif.

[73] Assignee: Tom Decker, Sonoma, Calif.

[21] Appl. No.: 620,248

[22] Filed: Mar. 22, 1996

Related U.S. Application Data

[63] Continuation-in-part of Ser. No. 709,858, Mar. 23, 1995, Pat. No. 5,537,728.

[51] Int. Cl.[6] .............................. B23Q 3/00; B26D 1/12; B27G 13/00

[52] U.S. Cl. .............................. 29/467; 29/464; 83/664; 144/218; 144/237; 144/238; 144/329

[58] Field of Search .............................. 144/218, 237, 144/238, 329; 29/464, 469, 26 A, 467; 83/664

[56] References Cited

U.S. PATENT DOCUMENTS 4,195,542 4/1980 Zimmer .............................. 83/664
5,316,061 5/1994 Lee .............................. 144/218

*Primary Examiner*—W. Donald Bray
*Attorney, Agent, or Firm*—Benman Collins & Sawyer

[57] ABSTRACT

A blade arrangement for cutting dados that includes magnetic dado spacers, which firmly adhere through magnetic attraction to the dado blades, is disclosed. Also, with the blade arrangement of the present invention, problems due to blade vibrations are reduced. The cutting width is conveniently measured and adjusted without having to repeatedly install and remove the nut, since the magnetic dado spacers hold adjacent blades firmly together, before they are tightened. Additionally, the use of magnetic dado spacers reduces the possibility of the spacers falling into and becoming caught in the thread of an arbor. A further advantage is that the magnetic dado spacers are much quicker and easier to install than prior art dado spacers. Also, the dado spacers of the present invention securely hold other conventional spacers against a blade, and are easily and economically made in a variety of different diameters, with different arbor hole sizes for fitting different saws, and in a variety of thicknesses for finely adjusting the spacing of dado blades.

24 Claims, 1 Drawing Sheet

DADO CUTTING BLADE ARRANGEMENT

This is a continuation-in-part of application Ser. No. 08/409,858 filed on Mar. 23, 1995, U.S. Pat. No. 5,537,728.

RELATED APPLICATION

The present invention relates to U.S. patent application Ser. No. 08/409,858, filed Mar. 23, 1995, now, U.S. Pat. No. 5,537,728, entitled "Magnetic Dado Spacer", and assigned to the assignee of the present invention.

1. Field of the Invention

This invention relates generally to dado blade arrangements used with power saws, and more specifically to a magnetic dado spacer used in dado blade arrangements.

2. Background of the Invention

A dado is a groove on a board for receiving the edge of another board, such as for joining perpendicular pieces of a cabinet, drawer, etc. A dado is typically cut with a set of dado blades, which usually includes a pair of circular blades spaced apart by one or more multiple tooth blades, conventionally called chipper blades. Most dado blades have standard arbor holes for mounting on the drive shaft or arbor of a power saw, and are tightened thereon by a nut and a washer. Standard thicknesses are conventionally used for dado blades, so that a suitable number of blades can be stacked together when needed to cut a dado of a desired size to accommodate various standard thicknesses in the boards. For example, two ⅛" thick circular blades may be spaced by two ⅛" thick chipper blades to make a ½" dado set for cutting a ½" dado for a ½" thick board.

Although boards are available in standard thicknesses, the actual thickness of any particular board can vary somewhat from its intended size due to variations in manufacturing, shrinkage, expansion, etc. Therefore, merely cutting a dado to a standard width often results in dados slightly too narrow or too wide for snugly receiving a board.

Various adjustable dado sets have been proposed for providing an adjustable cutting width. U.S. Pat. No. 5,368,079 to Benway (1994) shows a dado set with a special blade having a non-standard, threaded hole for receiving a threaded collar. Turning the collar adjusts the spacing of the special blade from other blades. U.S. Pat. Nos. 4,589,458 to McCord, Jr. (1986) and 5,309,962 to McCord, Jr. et al. (1994) each shows an adjustable dado set with special blades having non-standard holes for receiving a pair of opposite cams. Turning the cams adjusts the spacing between the blades. However, the Benway and McCord devices both require special blades specifically designed for fitting their adjusting mechanisms. Thus, they do not use conventional blades, and rather, require the inconvenience and expense of obtaining special replacement blades for these devices.

U.S. Pat. No. 5,316,061 to Lee (1994) shows plastic dado spacers for positioning between and spacing apart dado blades. The spacers are circular, and have an arbor hole and a radial slot. The spacers are provided in various thicknesses for adjusting the spacing of a set of blades. Unfortunately, these plastic spacers suffer from a common problem of dado spacers, namely, that they frequently fall into and get caught in the relatively coarse thread of the arbor, i.e., they become eccentrically positioned on the arbor. Other dado spacers commonly known in the wood-working trade which also suffer from this problem are simple discs each with an arbor hole sized for closely fitting on an arbor, and made of either paper or metal.

As a result of frequently falling on the arbor, the edges of the holes of the dado spacers are cut or otherwise damaged when the blades are tightened together. Further, the crumpled spacers often cause the blades to be improperly spaced. In addition, when the spacers fall into the arbor's thread, they hinder the installation and removal of the blades. When several spacers are used, the problem increases greatly, since a properly placed spacer may easily fall into the thread when trying to install additional spacers or blades. Therefore, ensuring the proper installation of conventional dado spacers is frustrating and time consuming. Furthermore, dado spacers formed of paper or metal are often subject to becoming bent or otherwise damaged in harsh shop environments. Unfortunately, once damaged, it is difficult to adequately flatten or repair paper or metal spacers.

Still another problem with dado blade arrangements is that blades stacked with either nothing or metal spacers therebetween are prone to metal-to-metal vibration. The vibration causes a high pitched screaming or whistling noise, which increases annoyance when used for prolonged periods of time and also may be a concern in environmentally conscious facilities.

Still a further problem exists when accurately trying to measure the total width of a set of dado blades mounted on an arbor. Before the blades are tightened, the spacers and blades tend to shift to one side of the arbor's coarse thread, so that they do not sit straight or parallel to each other. Thus, accurate measurement of the set is hampered.

A need exists for a dado blade arrangement that stays securely in position, that facilitates the installation and removal of dado blades, that adjusts the cutting width of a set of dado blades, that prevents screaming or whistling, and that allows accurate measurement.

SUMMARY OF THE INVENTION

The present invention addresses these needs. Accordingly, a blade arrangement in the present invention includes at least one dado spacer, and a plurality of dado blades, the at least one dado spacer positioned between the dado blades, and the dado blades held adjacently through magnetic attraction to the at least one dado spacer. The plurality of blades further includes at least one chipper blade and at least two cutting blades, and the at least one dado spacer includes a disc of magnetic sheathing with a predetermined shape. Further, the predetermined shape is circular, and the disc is formed with a central hole with a diameter of about 0.6"–1.25".

In another aspect, a blade arrangement for cutting dados in a surface in accordance with the present invention includes a plurality of dado spacers, the dado spacers having predetermined thicknesses, and a plurality of dado blades, the plurality of dado blades held securely together by the plurality of dado spacers through magnetic attraction to form a blade arrangement of a predetermined cutting width. The predetermined thicknesses are in the range of about 0.0007" to 0.05", and the plurality of dado blades includes at least one chipper blade and at least two cutting blades.

In a method aspect, a method for securely positioning a dado spacer in a blade arrangement for cutting dados includes forming at least one dado spacer with a predetermined shape from a magnetic sheathing, and positioning the at least one dado spacer adjacent a dado blade, wherein the at least one dado spacer is magnetically attracted to the dado blade.

Thus, the present invention presents aspects of a blade arrangement for cutting dados that includes magnetic dado spacers, which firmly adhere through magnetic attraction to the dado blades. The use of magnetic dado spacers therefore reduces the possibility of the spacers falling into and becoming caught in the thread of an arbor. A further advantage is that the magnetic dado spacers are much quicker and easier to install than prior art dado spacers. Also, with the blade arrangement of the present invention, problems due to blade vibrations are reduced. Further, the cutting width is conveniently measured and adjusted without having to repeatedly install and remove the nut, since the magnetic dado spacers hold adjacent blades firmly together before they are tightened.

Additionally, the dado spacers of the present invention securely hold other conventional spacers against a blade. Also, the magnetic dado spacers are easily and economically made in a variety of different diameters, with different arbor hole sizes for fitting different saws, and in a variety of thicknesses for finely adjusting the spacing of dado blades. These and other advantages of the aspects of the present invention will be more fully understood in conjunction with the following detailed description and accompanying drawings.

DETAILED DESCRIPTION OF THE INVENTION

The present invention relates to formation of a secure arrangement for cutting dados in a surface, such as wood. The following description is presented to enable one of ordinary skill in the art to make and use the invention and is provided in the context of a patent application and its requirements. Various modifications to the preferred embodiment and the generic principles and features described herein will be readily apparent to those skilled in the art.

Figure 1:
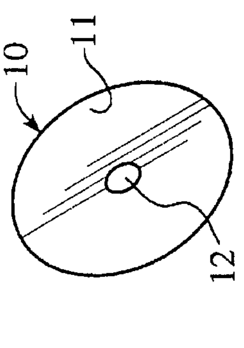
FIG. 1 is a side perspective view of a dado spacer in accordance with a preferred embodiment of the present invention.

In accordance with a preferred embodiment of the present invention shown in the side perspective view in FIG. 1, a dado spacer 10 is preferably formed in a desired shape, such as a circular shape 11, from a sheet of magnetic material and includes a central hole 12 appropriately sized for fitting an arbor of a predetermined diameter. By way of example, a 4" diameter of circularly-shaped dado spacer 10 is suitable, but, of course, may vary depending upon need. Further, suitable central hole 12 diameters include industry-standard sizes, such as ⅝" or 1¼", for closely fitting on standard arbors (not shown), and also include other diameters, such as about 0.9" (about 33 millimeters), 1", and any other suitable size for fitting other types of saws.

Preferably, dado spacer 10 is economically manufactured by being die-cut from commonly available, inexpensive and flexible magnetic sheathing material (not shown), which are available in a variety of thicknesses, including in the range of about 0.0007" to 0.05" and more particularly, 0.020", 0.012", 0.010", and 0.008", for making spacers of desired thicknesses. It should be appreciated that although dado spacer 10 is shown with a circular shape 11, other shapes, such as square, triangular, octagonal, etc., may also be used, if desired, without departing from the present invention.

Figure 2:
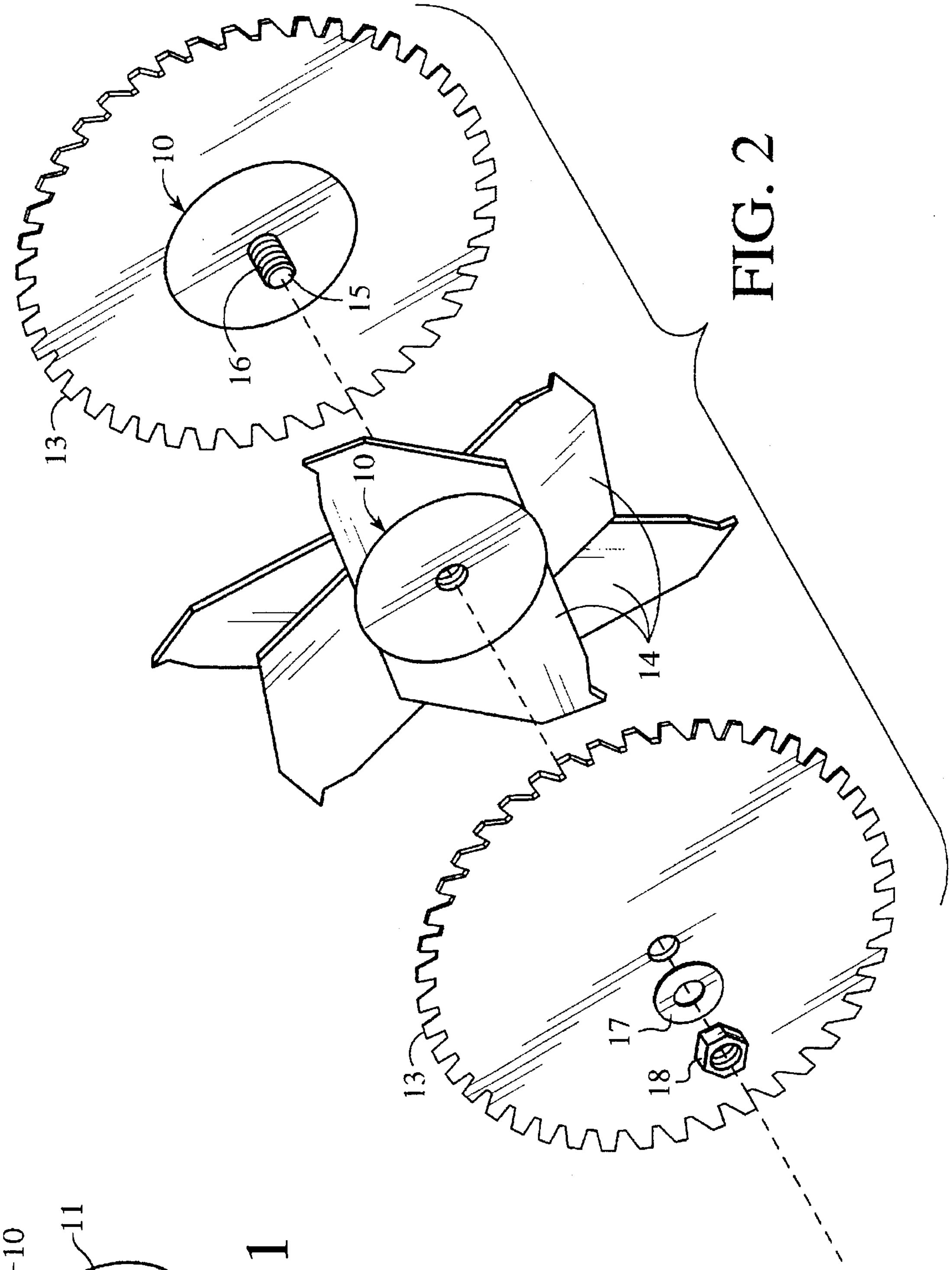
FIG. 2 is an exploded side perspective view of a blade arrangement for cutting dados in accordance with the present invention.

Referring now to FIG. 2, an example of a blade arrangement suitable for dado cutting includes dado spacers 10, dado blades including cutting blades 13 and chipper blades 14, an arbor 15 with thread 16, a washer 17 and a nut 18. Suitably, a dado spacer 10 is positioned concentrically on a cutting blade 13 and on a chipper blade 14. Preferably, the magnetic dado spacers 10 are positioned such that a chipper blade 14 adjacent a cutting blade 13 in the blade arrangement have at least one dado spacer therebetween. Conventional steel blades may be used as well as steel blades with carbide cutting tips, or diamond tips, as cutting blades 13 and chipper blades 14, as is well understood by those skilled in the art. Further, although three chipper blades 14 are shown, any number of chipper blades may be used as desired without departing from the present invention. Additionally, although chipper blades 14 are illustrated as two-tooth chipper blades, multiple tooth chipper blades are also suitable.

Once the spacers 10 are properly positioned, the blades 13 and 14 are fitted onto the arbor 15, such as the arbor of a power saw (not shown). The blade arrangement is then fastened by appropriately positioning washer 17 and nut 18 on the thread 16, which is well understood by those skilled in the art.

With the dado spacers 10 properly positioned on the blades, the spacers 10 stick firmly thereto by magnetic attraction and do not easily shift in position. Therefore, when dado blades 13 and 14 are being installed on arbor 15, dado spacers 10 do not fall into and get caught in the thread 16 thereof. Of course, although only two dado spacers 10 are shown, any number, as well as any combination of thicknesses of dado spacers 10 may be used and stacked together or alternated between blades for finely adjusting the total cutting width of dado blades 13 and 14.

Further, with dado spacers 10 magnetically held adjacent blades 13 and 14, the blade arrangement sticks firmly together in parallel by magnetic attraction before tightening, so that the total cutting width of the blades can be accurately measured and adjusted with additional or fewer spacers 10, without having to repeatedly install and remove washer 17 and nut 18. Furthermore, if a paper, plastic, or metal conventional spacer (not shown) is placed between magnetic dado spacer 10 and a blade, spacer 10 will hold the conventional spacer securely in place by attracting both toward the blade.

Another feature of the present invention is that removing dado blades 13 and 14 is much more convenient, because the dado spacers 10 remain attached to the dado blades 13 and 14 by magnetic attraction. As a further result, dado spacers 10 are much quicker and easier to install and remove than prior art dado spacers. Additionally, unlike prior art paper and metal dado spacers, which are easily damaged, magnetic dado spacers 10 are flexible, and able to withstand a great deal of abuse without suffering significant damage. Also, dado spacers 10 dampen vibration between adjacent blades 13 and 14, so that they reduce annoying screaming or whistling of the blades 13 and 14 during operation.

Although the above descriptions are specific, they should not be considered as limitations on the scope of the invention, but only as examples of the preferred embodiment. Many other ramifications and variations are possible within the teachings of the invention. Therefore, the scope of the invention should not be determined by the examples given, but by the appended claims and their legal equivalents.

What is claimed is:

1. A blade arrangement for cutting dados in a surface comprising:

at least one dado spacer; and a plurality of dado blades, the at least one dado spacer positioned between the dado blades, and the dado blades held adjacently through magnetic attraction to the at least one dado spacer.

2. The blade arrangement of claim 1 wherein the plurality of blades comprises at least one chipper blade and at least two cutting blades.

3. The blade arrangement of claim 1 wherein the at least one chipper blade comprises a two-tooth blade.

4. The blade arrangement of claim 1 wherein the at least one chipper blade comprises a multiple tooth blade.

5. The blade arrangement of claim 1 wherein the at least one dado spacer comprises a disc of magnetic sheathing.

6. The blade arrangement of claim 5 wherein the disc has a predetermined shape.

7. The blade arrangement of claim 6 wherein the predetermined shape is circular.

8. The blade arrangement of claim 5 wherein the disc is formed with a central hole.

9. The blade arrangement of claim 8 wherein the central hole has a diameter of about 0.6"–1.25".

10. The blade arrangement of claim 1 wherein the plurality of blades comprise steel blades with carbide tips.

11. The blade arrangement of claim 1 wherein the plurality of blades comprise steel blades with steel tips.

12. The blade arrangement of claim 1 wherein the plurality of blades comprise steel blades with diamond tips.

13. A blade arrangement for cutting dados in a surface comprising:

a plurality of dado spacers, the dado spacers having predetermined thicknesses; and a plurality of dado blades, the plurality of dado blades held securely together by the plurality of dado spacers through magnetic attraction to form a blade arrangement of a predetermined cutting width.

14. The blade arrangement of claim 13 wherein the predetermined thicknesses are in the range of about 0.0007" to 0.05".

15. The blade arrangement of claim 13 wherein the plurality of dado blades comprises at least one chipper blade and at least two cutting blades.

16. The blade arrangement of claim 13 wherein the plurality of dado blades comprise steel blades.

17. The blade arrangement of claim 16 wherein the steel blades have steel tips.

18. The blade arrangement of claim 16 wherein the steel blades have carbide tips.

19. The blade arrangement of claim 16 wherein the steel blades have diamond tips.

20. A method for securely positioning a dado spacer in a blade arrangement for cutting dados, the method comprising:

forming at least one dado spacer with a predetermined shape from a magnetic sheathing; and positioning the at least one dado spacer adjacent a dado blade, wherein the at least one dado spacer is magnetically attracted to the dado blade.

21. The method of claim 20 wherein the magnetic material has a predetermined thickness.

22. The method of claim 21 wherein the predetermined thickness comprises thicknesses in the range of about 0.0007" to 0.05".

23. The method of claim 20 wherein the step of positioning further comprises aligning a central hole of the at least one dado spacer with a hole of the dado blade.

24. The method of claim 23 wherein the central hole has a diameter of about 0.6"–1.25".

* * * * *